United States Patent
Harada et al.

(10) Patent No.: US 9,628,644 B2
(45) Date of Patent: Apr. 18, 2017

(54) CONTROLLER FOR IMAGING TERMINAL

(71) Applicants: Hironori Harada, Chiryu (JP); Kanae Tamura, Kariya (JP); Kan Ishimoto, Seto (JP); Yusuke Kida, Nagoya (JP)

(72) Inventors: Hironori Harada, Chiryu (JP); Kanae Tamura, Kariya (JP); Kan Ishimoto, Seto (JP); Yusuke Kida, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 774 days.

(21) Appl. No.: 14/039,879

(22) Filed: Sep. 27, 2013

(65) Prior Publication Data

US 2014/0146179 A1    May 29, 2014

(30) Foreign Application Priority Data

Nov. 28, 2012   (JP) .................................. 2012-260259

(51) Int. Cl.
*H04N 1/00* (2006.01)
*G06K 9/00* (2006.01)
*H04N 1/32* (2006.01)

(52) U.S. Cl.
CPC ..... *H04N 1/00408* (2013.01); *G06K 9/00624* (2013.01); *H04N 1/0035* (2013.01); *H04N 1/32* (2013.01)

(58) Field of Classification Search
CPC ........................ H04N 1/00408; G06K 9/00624
See application file for complete search history.

(56) References Cited

U.S. PATENT DOCUMENTS 6,246,804 B1 *   6/2001   Sato .................. G06F 17/30256
                                                                382/284
2001/0041008 A1   11/2001  Kasutani
(Continued)

FOREIGN PATENT DOCUMENTS

JP   H08-202733 A   8/1996
JP   2001-167118 A   6/2001
(Continued)

OTHER PUBLICATIONS

Japanese Office Action dated Oct. 20, 2015 received in related application JP 2012-260259 together with an English language translation.
(Continued)

*Primary Examiner* — Obafemi Sosanya
(74) *Attorney, Agent, or Firm* — Scully, Scott, Murphy & Presser, PC

(57) ABSTRACT

A controller for an imaging terminal having an imaging device and a first displaying device includes a processor and a memory. The memory stores instructions, when executed by the processor, causing the processor to perform: acquiring shot image data, the shot image data being obtained by shooting a second displaying device which is a part of an apparatus, the apparatus being a target device to be shot, the second displaying device being configured to display a specific state image indicative of a current state of the apparatus; acquiring, by analyzing the shot image data, specific identification information for identifying specific relevant information associated with the specific state image; acquiring the specific relevant information by using the specific identification information; and controlling the first displaying device to display the specific relevant information.

13 Claims, 11 Drawing Sheets

(56) References Cited

U.S. PATENT DOCUMENTS

2005/0094161 A1* 5/2005 Do .................... H04N 1/32112
358/1.1
2008/0279481 A1* 11/2008 Ando ................ G06F 17/30277
382/306

FOREIGN PATENT DOCUMENTS

| JP | 2005-215922 A | 8/2005 |
| --- | --- | --- |
| JP | 2005-333406 A | 12/2005 |
| JP | 2006-285654 A | 10/2006 |
| JP | 2007-041840 A | 2/2007 |
| JP | 2007-094962 A | 4/2007 |
| JP | 2008-234327 A | 10/2008 |
| JP | 2011-097287 A | 5/2011 |

OTHER PUBLICATIONS

Japanese Official Action dated May 10, 2016 together with an English language translation from corresponding JP 2012-260259.

\* cited by examiner

FIG. 7A

MFC-XXXXXAAAA   CANDIDATE IMAGE CHARACTERISTICS TABLE   DT11

| CANDIDATE IMAGE | CANDIDATE IMAGE INFORMATION | CORRESPONDING URL |
|---|---|---|
| ERROR DISPLAY IMAGE 1 | COLOR DATA 1 ARRANGEMENT DATA 1 | URL1 |
| ERROR DISPLAY IMAGE 2 | COLOR DATA 2 ARRANGEMENT DATA 2 | URL2 |
| ERROR DISPLAY IMAGE 3 | COLOR DATA 3 ARRANGEMENT DATA 3 | URL3 |
| ⋮ | ⋮ | ⋮ |

FIG. 7B

MFC-YYYYYAAAA   CANDIDATE IMAGE CHARACTERISTICS TABLE   DT12

| CANDIDATE IMAGE | CANDIDATE IMAGE INFORMATION | CORRESPONDING URL |
|---|---|---|
| ERROR DISPLAY IMAGE 1 | COLOR DATA 1 ARRANGEMENT DATA 1 | URL4 |
| ERROR DISPLAY IMAGE 2 | COLOR DATA 2 ARRANGEMENT DATA 2 | URL5 |
| ERROR DISPLAY IMAGE 3 | COLOR DATA 3 ARRANGEMENT DATA 3 | URL6 |
| ⋮ | ⋮ | ⋮ |

FIG. 7C

MFC-XXXXXDDDD   CANDIDATE IMAGE CHARACTERISTICS TABLE   DT13

| CANDIDATE IMAGE | CANDIDATE IMAGE INFORMATION | CORRESPONDING URL |
|---|---|---|
| ERROR DISPLAY IMAGE 4 | COLOR DATA 4 ARRANGEMENT DATA 4 | URL7 |
| ERROR DISPLAY IMAGE 5 | COLOR DATA 5 ARRANGEMENT DATA 5 | URL8 |
| ERROR DISPLAY IMAGE 6 | COLOR DATA 6 ARRANGEMENT DATA 6 | URL9 |
| ⋮ | ⋮ | ⋮ |

CONTROLLER FOR IMAGING TERMINAL

CROSS REFERENCE TO RELATED APPLICATIONS

This application claims priority from Japanese Patent Application No. 2012-260259 filed Nov. 28, 2012. The entire content of the priority application is incorporated herein by reference.

TECHNICAL FIELD

The invention relates to technology of utilizing a shot image, and more particularly to technology of providing a user with information by using the shot image.

BACKGROUND

Technology of providing a user with information using a shot image (an image taken with a camera) is known. For example, technology is disclosed that a commercial image broadcasted on television includes image information indicative of a link destination for accessing detailed information of a product that is promoted in the commercial (for example, URL (Uniform Resource Locator)). And, a mobile phone analyzes a shot image that is obtained by imaging the image of the commercial, and acquires URL for accessing the detailed information of the product. And, the mobile phone accesses a server by using the acquired URL to acquire the detailed information of the product, and displays the detailed information on a displaying section.

SUMMARY

In view of the foregoing, the invention provides a controller for an imaging terminal including an imaging device and a first displaying device. The controller includes a processor and a memory. The memory stores instructions, when executed by the processor, causing the processor to perform: acquiring shot image data, the shot image data being obtained by shooting a second displaying device which is a part of an apparatus, the apparatus being a target device to be shot, the second displaying device being configured to display a specific state image indicative of a current state of the apparatus; acquiring, by analyzing the shot image data, specific identification information for identifying specific relevant information associated with the specific state image; acquiring the specific relevant information by using the specific identification information; and controlling the first displaying device to display the specific relevant information.

According to another aspect, the invention also provides a non-transitory computer-readable medium storing a set of instructions. When executed by a processor of an imaging terminal including an imaging device and a first displaying device, the set of instructions causes the processor to perform: acquiring shot image data, the shot image data being obtained by shooting a second displaying device which is a part of an apparatus, the apparatus being a target device to be shot, the second displaying device being configured to display a specific state image indicative of a current state of the apparatus; acquiring, by analyzing the shot image data, specific identification information for identifying specific relevant information associated with the specific state image; and acquiring the specific relevant information by using the specific identification information to control the first displaying device to display the specific relevant information.

The invention can be realized in various modes such as a method of controlling an imaging terminal including an imaging device and a displaying device, a computer program for realizing a function or method of these devices, a storage medium storing the program, and the like.

BRIEF DESCRIPTION OF THE DRAWINGS

Embodiments in accordance with the invention will be described in detail with reference to the following figures wherein:

FIGS. 7A through 7C are views for showing the contents of a candidate-image-characteristics table group DT1;

DETAILED DESCRIPTION

A. First Embodiment

Figure 1:
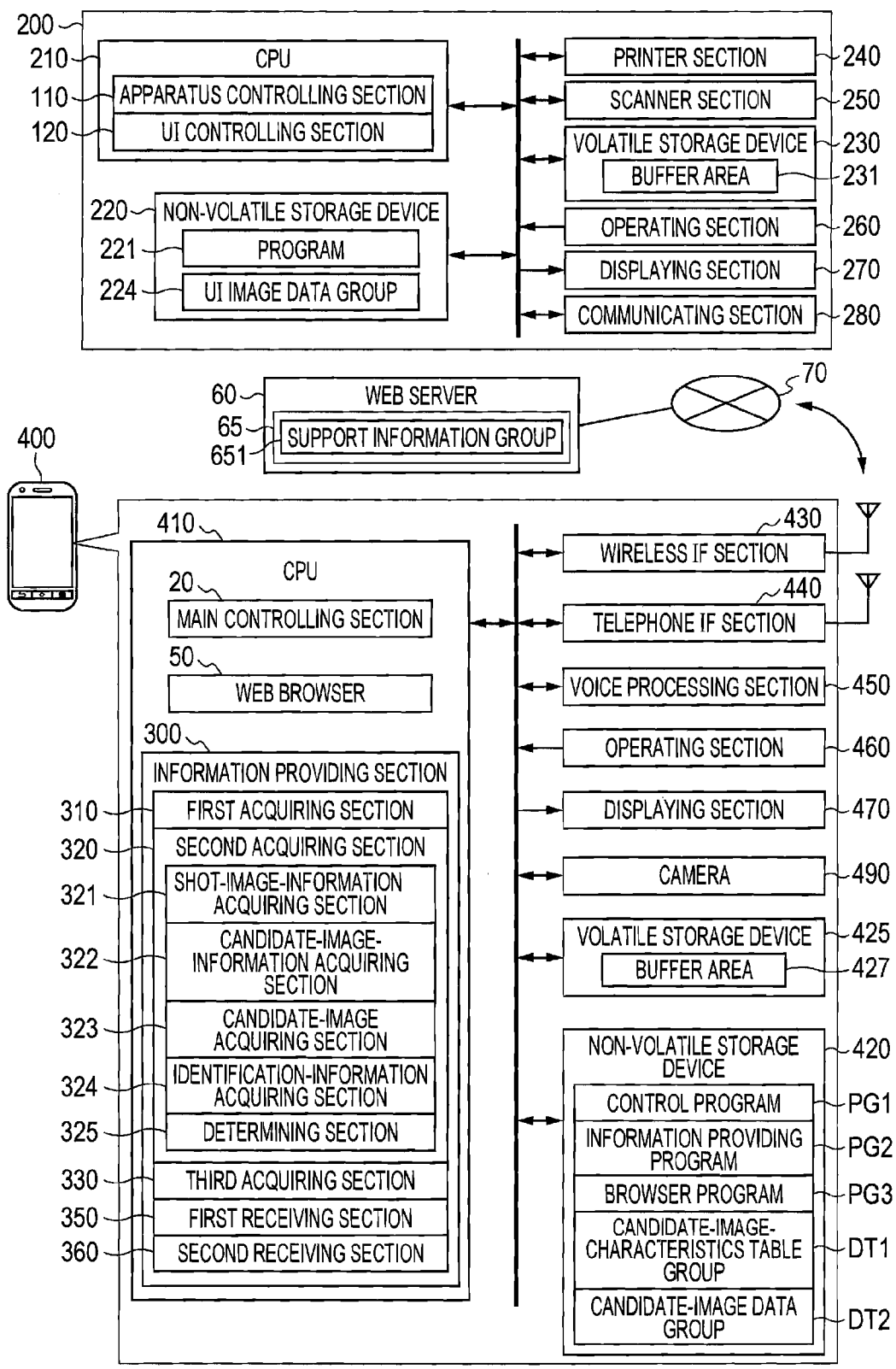
FIG. 1 is a block diagram showing the configuration of an information providing system according to a first embodiment.
Figure 2:
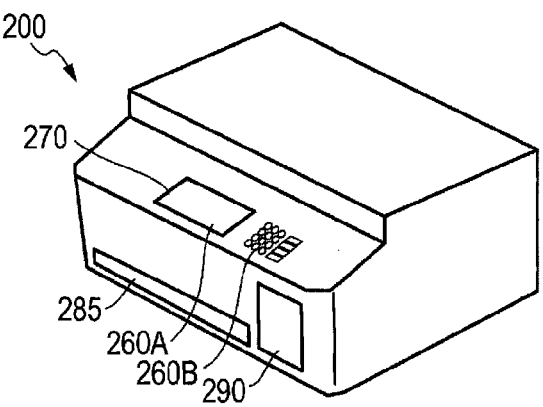
FIG. 2 is a perspective view showing the appearance of a multifunction peripheral.

A-1. Configuration of System:

A first embodiment of the invention will be described while referring to FIGS. 1 through 12. As shown in FIGS. 1 and 2, this system includes a multifunction peripheral 200, a server 60 connected to Internet 70, and a mobile terminal 400.

The multifunction peripheral 200 includes a CPU 210, a non-volatile storage device 220 such as a hard disk drive and a flash memory, a volatile storage device 230 such as a RAM, a printer section 240 serving as an inkjet-type print engine, a scanner section 250 that optically reads an original document by using an optical sensor (for example, CIS (Contact Image Sensor)), an operating section 260 including a touch panel 260A, buttons 260B (FIG. 2), and the like, a displaying section 270 including a display panel such as an LCD lapped over the touch panel, and a communicating section 280 including an interface (IF) for performing data communication with an external device such as a personal computer (not shown). The displaying section 270 is disposed such that a display surface of an LCD panel is located at the upper near side of the multifunction peripheral 200 (FIG. 2). The multifunction peripheral 200 further includes a paper feeding tray 285 and an ink mounting section 290 at positions adjacent to the bottom surface of the casing of the multifunction peripheral 200 (FIG. 2). The paper feeding tray 285 is disposed so as to be pulled out toward the front. Ink cartridges storing ink as printing material for the printer section 240 to perform printing are mounted on the ink mounting section 290.

The volatile storage device 230 includes a buffer area 231 that temporarily stores various intermediate data that is generated when the CPU 210 performs processing. The non-volatile storage device 220 stores a computer program 221 for controlling the multifunction peripheral 200, and a UI image data group 224.

The computer program 221 is, for example, preliminarily stored in the non-volatile storage device 220 when the multifunction peripheral 200 is shipped. Alternatively, the computer program 221 could be provided in a form recorded in a CD-ROM or the like, or in a form downloaded from a server.

The UI image data group 224 includes a plurality of UI image data indicative of a plurality of kinds of UI images that will be described while referring to FIGS. 3A and 3B. The UI image data are RGB image data in which colors of plurality of pixels constituting the UI image are represented by RGB values, for example.

The CPU 210 executes the computer program 221 to control the entirety of the multifunction peripheral 200. Specifically, the CPU 210 serves as an apparatus controlling section 110 and a UI controlling section 120. The apparatus controlling section 110 controls the printer section 240, the scanner section 250, and the like to realize main functions of the multifunction peripheral 200 such as an image printing process and an image reading process. The UI controlling section 120 provides user interfaces for receiving operations by a user and for providing the user with information relating to the multifunction peripheral 200. Specifically, the UI controlling section 120 uses UI image data included in the UI image data group 224 to control the displaying section 270 to display a UI image including images indicating buttons etc. and a UI image for showing, to the user, information on the current state of the multifunction peripheral 200 depending on the current state. Further, the UI controlling section 120 executes a process of receiving a user's operation through a displayed UI image.

The server 60 is a well-known computer and executes a server program (not shown) to provide the mobile terminal 400 and a client computer such as a personal computer (not shown) with a WEB service. A storage section 65 of the server 60 stores a support information group 651 for supporting the user of the multifunction peripheral 200 in a form of WEB pages. The WEB service by the server 60 is to provide the user with support information. The server 60 is, for example, operated by a vender that sells the multifunction peripheral 200 as a product (apparatus).

The mobile terminal 400 is, for example, a multifunction mobile phone such as a smart phone that is owned by the user of the multifunction peripheral 200. The mobile terminal 400 mainly includes a CPU 410, a non-volatile storage device 420 such as a flash memory, a volatile storage device 425 including a RAM etc. and used for a buffer area 427 etc., a wireless IF section 430, a telephone IF section 440, a voice processing section 450 including a speaker, a microphone, etc. and realizing a telephone function or the like, an operating section 460 including a touch panel, operation keys, etc., a displaying section 470 including an LCD panel lapped over the touch panel or the like, and a camera 490 that performs imaging (shooting) by using an image sensor.

The wireless IF section 430 includes an antenna and, for example, performs wireless communication via an access point (not shown) (wireless communication complying with an infrastructure mode). The wireless IF section 430 is used for the mobile terminal 400 to access the server 60 as will be described later.

The telephone IF section 440 includes an antenna, and performs wireless communication with a base station (not shown) in compliance with a mobile-phone communication method (for example, W-CDMA). The telephone IF section 440 is, for example, realizes telephone and connection to the Internet 70 via the base station. Like the wireless IF section 430, the telephone IF section 440 is used for the mobile terminal 400 to access the server 60.

The camera 490 is a well-known digital camera, and can generate and acquire image data representing an imaging subject. Note that generation and acquisition of image data by the camera 490 include not only generating and acquiring image data of a relatively high resolution upon an instruction of the user (specifically, a press of the shutter button) and storing the image data in the non-volatile storage device 420, for example, but also include continuously (for example, each 100 msec) generating and acquiring image data of a relatively low resolution for displaying the image data on the displaying section 470 and temporarily storing the image data in the volatile storage device 425.

The non-volatile storage device 420 stores a control program PG1, an information providing program PG2, a browser program PG3, a candidate-image-characteristics table group DT1 used in an information providing process described later, and a candidate-image data group DT2. The control program PG1 is a program for realizing a function of OS (operating system), a telephone function, a control function of the camera 490, and a basic function of the mobile terminal 400. The browser program PG3 is a program for realizing a function as a WEB browser for browsing WEB pages. The control program PG1 and the browser program PG3 are, for example, supplied by the manufacturer of the mobile terminal 400, and are preliminarily stored at shipping. The information providing program PG2 is a program for realizing a process of providing the user with information on the multifunction peripheral 200 in cooperation with the server 60. The information providing program PG2 is a program for adding a new function to the mobile terminal 400 (also referred to as "app" or "application"). For example, the information providing program PG2 is supplied by a supplier different from the manufacturer of the mobile terminal 400 (for example, the manufacturer of the multifunction peripheral 200) in a form downloaded from a predetermined server. When the information providing program PG2 is downloaded from the predetermined server, the candidate-image-characteristics table group DT1 and the candidate-image data group DT2 are also downloaded from the predetermined server. The information providing program PG2, the candidate-image-characteristics table group DT1, and the candidate-image data group DT2 may be, for example, supplied by the manufacturer of the mobile terminal 400, and may be preliminarily stored at shipping.

The CPU 410 executes the control program PG1 to serve as a main controlling section 20 realizing the basic function of the mobile terminal 400, and executes the browser program PG3 to serve as the WEB browser 50. Further, the CPU 410 executes the information providing program PG2 to serve as an information providing section 300.

The information providing section 300 includes a first acquiring section 310, a second acquiring section 320, a third acquiring section 330, a first receiving section 350, and a second receiving section 360. The second acquiring section 320 includes a shot-image-information acquiring section 321, a candidate-image-information acquiring section 322, a candidate-image acquiring section 323, an identification-information acquiring section 324, and a determining section 325. Each process of these sections will be described later.

The multifunction peripheral 200 is an example of a product (apparatus) including an apparatus-side displaying device (displaying section 270). The mobile terminal 400 is an example of an imaging terminal including an imaging device (camera 490) and a terminal-side displaying device (displaying section 470). The CPU 410 of the mobile terminal 400 serving as the information providing section 300 is an example of a controller for the imaging terminal. The WEB browser 50 is an example of a display controlling section.

A-2. UI Image of Multifunction Peripheral 200:

Next, UI images displayed on the displaying section 270 of the multifunction peripheral 200 by the UI controlling section 120 will be described.

Figure 3A:
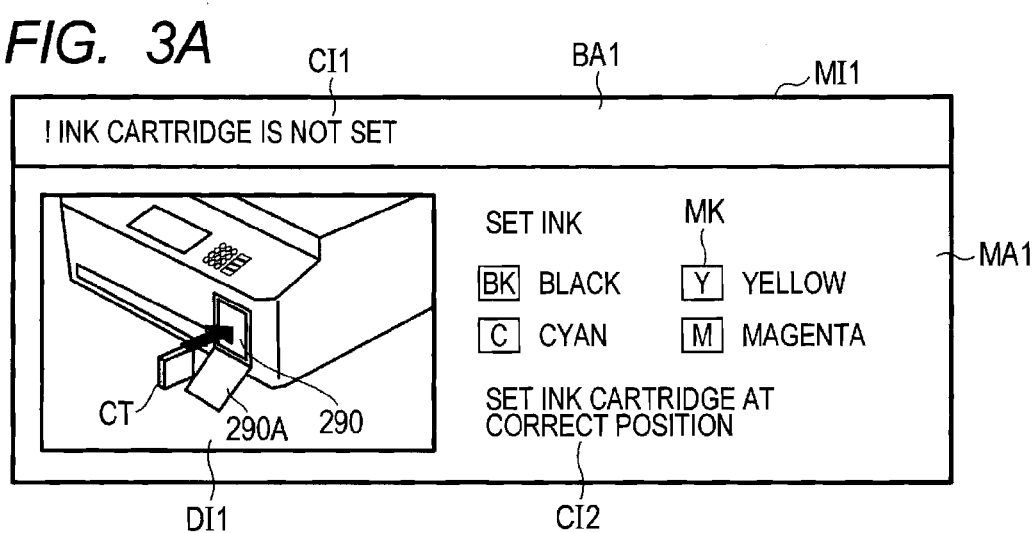
FIGS. 3A and 3B are views showing examples of UI images.

A first UI image MI1 shown in FIG. 3A is a UI image for showing the user an occurrence of an error that ink cartridges CT to be mounted on the ink mounting section 290 are not mounted. Note that FIG. 3A shows a situation in which none of four (BK, Y, C, M) ink cartridges CT are mounted. The first UI image MI1 includes a band region BA1 located in a band shape along the upper end of the image, and a main display region MA1 located at the lower side of the band region BA1. The color of the band region BA1 is different from the color of the main display region MA1. For example, the color of the band region BA1 is a color of relatively high chromaticness, such as yellow and green. The color of the main display region MA1 is a color of relatively low chromaticness and brightness, such as black and gray. The band region BA1 and the main display region MA1 include character images CI1 and CI2, respectively, representing information on the errors with characters (letters). The main display region MA1 further includes an apparatus image DI1 showing information on the error with a perspective view of the multifunction peripheral 200, symbol images MK showing information on the error with a symbol, and the like.

Figure 3B:
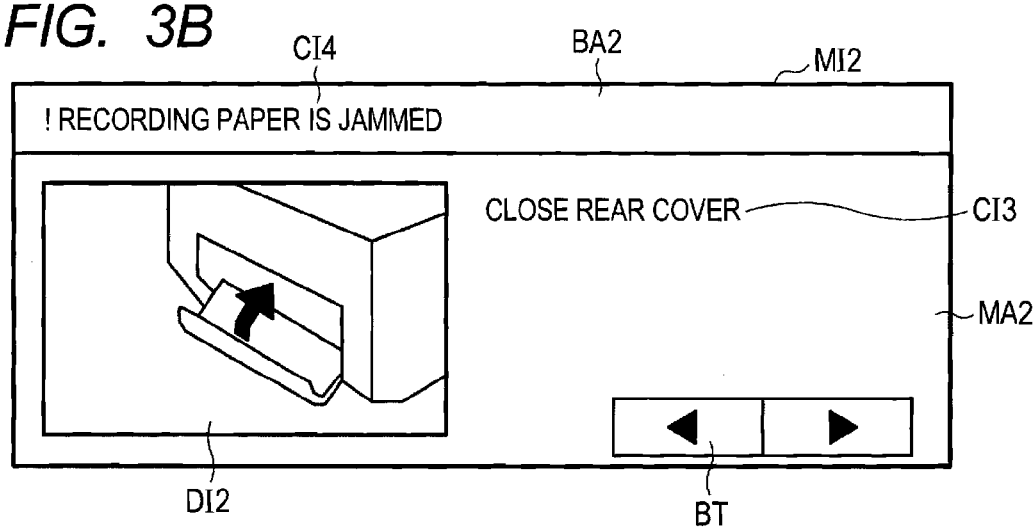

A second UI image MI2 shown in FIG. 3B is a UI image for showing the user an error that is different from the error indicated by the UI image MI1. The second UI image MI2 is a UI image for showing the user an occurrence of an error that printing paper is jammed at a certain portion of a paper conveying mechanism of the printer section 240 and that the printing process cannot be continued (so-called paper jam). Like the first UI image MI1, the second UI image MI2 includes a band region BA2 and a main display region MA2. The band region BA2 includes a character image CI4 representing information on the error with characters. The main display region MA2 includes a character image CI3 representing information on the error with characters, an apparatus image DI2 representing a perspective view of the multifunction peripheral 200, and a button image BT for switching an image displayed on the displaying section 270 from the second UI image MI2 to another UI image (not shown) for showing the user information relating to the second UI image MI2. The apparatus image DI1 of the first UI image MI1 and the apparatus image DI2 of the second UI image MI2 have the same position and size in the display area of the displaying section 270. However, displayed portions of the apparatus and states of the apparatus (an open/close state of a certain open/close member such as a cover etc.) of the apparatus image DI1 and the apparatus image DI2 are different from each other.

Note that the first UI image MI1 and the second UI image MI2 shown in FIGS. 3A and 3B are examples of state images indicative of a state of the apparatus.

Figure 4:
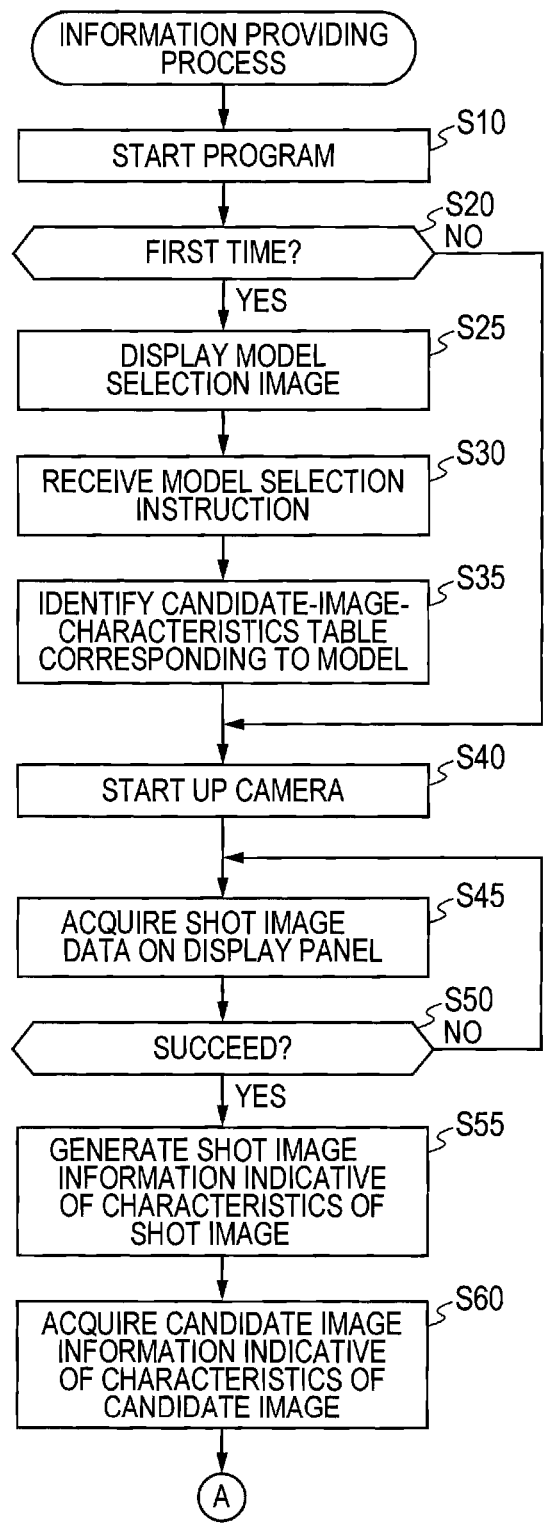
FIG. 4 is a flowchart showing a part of an information providing process.
Figure 5:
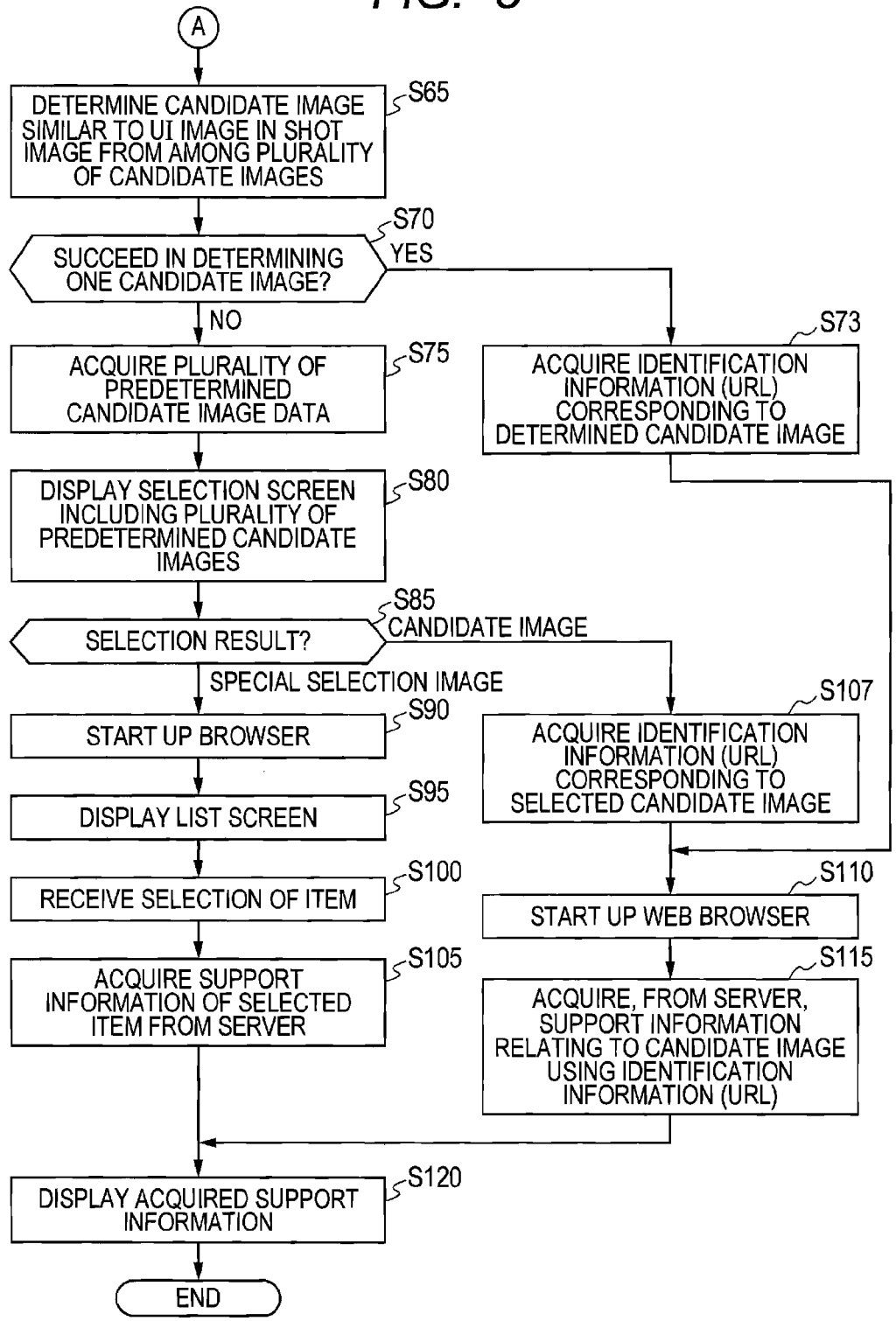
FIG. 5 is a flowchart showing the other part of the information providing process.

A-3. Process of Information Providing Section 300 of Mobile Terminal 400:

FIGS. 4 and 5 shows an information providing process executed by the information providing section 300 (FIG. 1) of the mobile terminal 400. The information providing process is executed, for example, when the displaying section 270 displays a specific UI image indicating that the state of the multifunction peripheral 200 is a specific state, and the user starts the information providing program PG2 for acquiring information relating to the specific UI image. More specifically, for example, the information providing process is executed when the multifunction peripheral 200 is in an error state that an ink cartridge is not mounted or the like, and the displaying section 270 displays an UI image indicative of the error state (for example, the first UI image MI1 (FIG. 3A)), and the user starts the information providing program PG2 for obtaining a solution of the error state in detail.

In S10, a starting process of the information providing section 300 (the information providing program PG2) is executed so that the information providing section 300 is operable. Then, the information providing section 300 determines whether the starting process of the information providing section 300 in S10 is the first time (S20). For example, the information providing section 300 determines that the starting process this time is not the first time if a subject model (the model of the multifunction peripheral 200) is already registered, and determines that the starting process this time is the first time if the subject model is not registered.

If it is determined that the starting process is the first time (S20: YES), the first receiving section 350 displays a model selection image MD1 on the displaying section 470 (S25), and receives a model selection instruction from the user through the displayed model selection image MD1 (S30).

Figure 6:
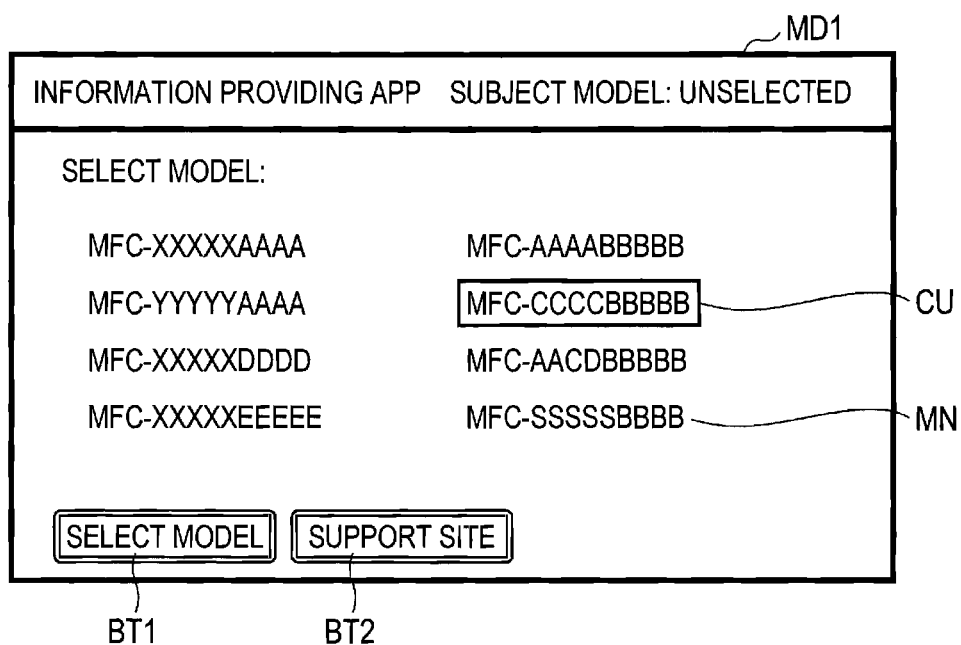
FIG. 6 is a view showing an example of a model selection image MD1.

As shown in FIG. 6, the model selection image MD1 includes a list MN of names (model numbers etc.) of models that can be dealt with by the information providing section 300. The user moves a cursor CU to select the model name of the multifunction peripheral 200 used by the user, and touches a model selection button BT1, thereby inputting the subject model. Based on the input from the user, the first receiving section 350 generates model information indicative of the subject model, and registers (stores) the model information in a predetermined area of the non-volatile storage device 420.

In S35, the second acquiring section 320 identifies a candidate image characteristics table corresponding to the subject model.

FIGS. 7A through 7C show contents of the candidate-image-characteristics table group DT1 (FIG. 1). The candidate-image-characteristics table group DT1 includes N candidate image characteristics tables DT11-DT1N corresponding respectively to N models (N is a natural number) that can be dealt with by the information providing section 300. FIGS. 7A through 7C only show three candidate image characteristics tables DT11-DT13. In the candidate image characteristics table DT11, candidate image information indicative of characteristics of candidate images and corresponding URLs are stored in association with the candidate images. It can be also said that the corresponding URL is associated with the candidate image information. Here, the candidate images are a plurality of kinds of UI images that can be displayed on the displaying section 270 in the model corresponding to the table, that is, images represented by a plurality of kinds of UI image data included in the UI image data group 224 stored in the multifunction peripheral 200. Further, the candidate images are images representing candidates of a UI image included in a shot image (described later) taken by the user. Note that the candidate image characteristics table DT11 need not include all kinds of UI images that can be displayed in the corresponding model as the candidate images, but preferably includes part of main UI image group out of all kinds of UI images.

In the present embodiment, the candidate image information is a set of color data representing characteristics relating to the color of the candidate image and arrangement data representing characteristics relating to arrangement of the candidate image.

Description will be provided by taking, as an example, a case where the first UI image MI1 shown in FIG. 3A is the candidate image. The arrangement data is, for example, data representing arrangement, in the image, of elements presented in the candidate image. For example, the arrangement data of the first UI image MI1 is a data representing arrangement of the band region BA1 and the main display region MAL arrangement of the character images CI1 and CI2, and arrangement of the apparatus image DI1 and the symbol image MK. For example, the candidate image is divided into M×K square blocks (M blocks vertically and K blocks horizontally; M and K are natural numbers of approximately 20 to 200, for example). And, an object identifier for identifying an object in each block is assigned to each block. The value of the object identifier is referred to as an object identification value. Here, the objects include a character, an apparatus image, a symbol, background 1 (band region), and background 2 (main display region). The object identification value is 1 for the character and 2 for the apparatus image, and the like (character=1, apparatus image=2, . . . ). The data acquired in this way is used as the arrangement data (also referred to as block image data). That is, the arrangement data is image data that is constituted by M×K pixel values (M pixels vertically and K pixels horizontally) corresponding to M×K blocks (M blocks vertically and K blocks horizontally), where the pixel value is the object identification value. The arrangement data can be different between different UI images. For example, the arrangement data for the first UI image MI1 shown in FIG. 3A is different from the arrangement data for the second UI image MI2 shown in FIG. 3B, due to different characteristics such as the horizontal length of a character string in the character image CI1, the arrangement position of the character image CI2, and the like.

The color data is data representing color distribution characteristics of elements presented in the candidate image. For example, histogram data created for each of plurality of regions (a region of a character image, a region of the apparatus image DI1, . . . ) defined in the arrangement data is used as the color data. As is well known, the histogram data is data obtained by classifying each pixel in an image into a plurality of classes depending on the color. The color data can be different between different UI images. For example, the color data for the first UI image MI1 shown in FIG. 3A is different from the color data for the second UI image MI2 shown in FIG. 3B, due to difference between the color distribution characteristics of the apparatus image DI1 in the first UI image MI1 shown in FIG. 3A and the color distribution characteristics of the apparatus image DI2 in the second UI image MI2 shown in FIG. 3B.

The corresponding URL (Uniform Resource Locator) is positional information indicative of a position, in the server 60, of a WEB page including support information relating to the corresponding candidate image (UI image). If the UI image is an image relating to an error state, for example, the support information relating to the UI image includes a solution of the error, information on a consumable needed to solve the error, and the like. Note that the support information relating to the candidate image (UI image) is an example of relevant information.

The other candidate image characteristics tables DT12 and DT13 (FIGS. 7B and 7C) have the same configuration. Here, the candidate image characteristics table DT12 (FIG. 7B) stores the same plurality of candidate images (error display images 1, 2, 3) as the plurality of candidate images stored in the candidate image characteristics table DT11. And, two URLs (for example, URL1 and URL4) corresponding to the same candidate image (for example, error display image 1) stored in each of the two tables are different from each other. That is, it can be seen that, even if two displayed UI images are the same, provided support information differs depending on the subject model.

In S35 in FIG. 4, the second acquiring section 320 identifies the candidate image characteristics table corresponding to the subject model from among the candidate-image-characteristics table group DT1 shown in FIGS. 7A-7C. If the candidate-image-characteristics table group DT1 is not stored in the non-volatile storage device 420, or if the candidate-image-characteristics table group DT1 does not include a desired candidate image characteristics table, the second acquiring section 320 may transmit, to the server 60, model information indicative of the subject model as well as a command for requesting transmission of the candidate image characteristics tables, for example, thereby acquiring a desired candidate image characteristics table from the server 60.

In S40, the first acquiring section 310 starts up the camera 490 so that the camera 490 can perform imaging. In S45, the first acquiring section 310 acquires shot image data that is obtained by imaging the UI image displayed on the display panel of the displaying section 270 of the multifunction peripheral 200. For example, the first acquiring section 310 displays, on the displaying section 470, a message prompting the user to image the display panel (UI image). Then, the first acquiring section 310 acquires shot image data with an imaging operation of the user (an operation of the shutter button, etc.) or automatic imaging using automatic recognition.

In S50, the first acquiring section 310 determines whether the first acquiring section 310 has succeeded in acquisition of shot image data. If the first acquiring section 310 acquires some shot image data, the first acquiring section 310 determines that the first acquiring section 310 has succeeded in acquisition of shot image data due to the imaging operation by the user. Or, when shot image data is acquired, the first acquiring section 310 may perform a relatively simple analysis on the shot image data, and may determine that the first acquiring section 310 has succeeded in acquisition of shot image data when the first acquiring section 310 recognizes a rectangular object in the shot image, because the rectangular object is relatively likely to be the display panel of the displaying section 270. The rectangular object is recognized by performing an edge extracting process on the shot image data and by extracting a rectangular object having an aspect ratio similar to that of the display panel.

If it is not determined that the first acquiring section 310 has succeeded in acquisition of shot image data (S50: NO), the first acquiring section 310 continues acquisition of shot image data. If it is determined that the first acquiring section 310 has succeeded in acquisition of shot image data (S50: YES), the first acquiring section 310 stores the shot image data in the buffer area 427. The displaying section 470 displays shot image represented by the shot image data so that the user can check.

Figure 8:
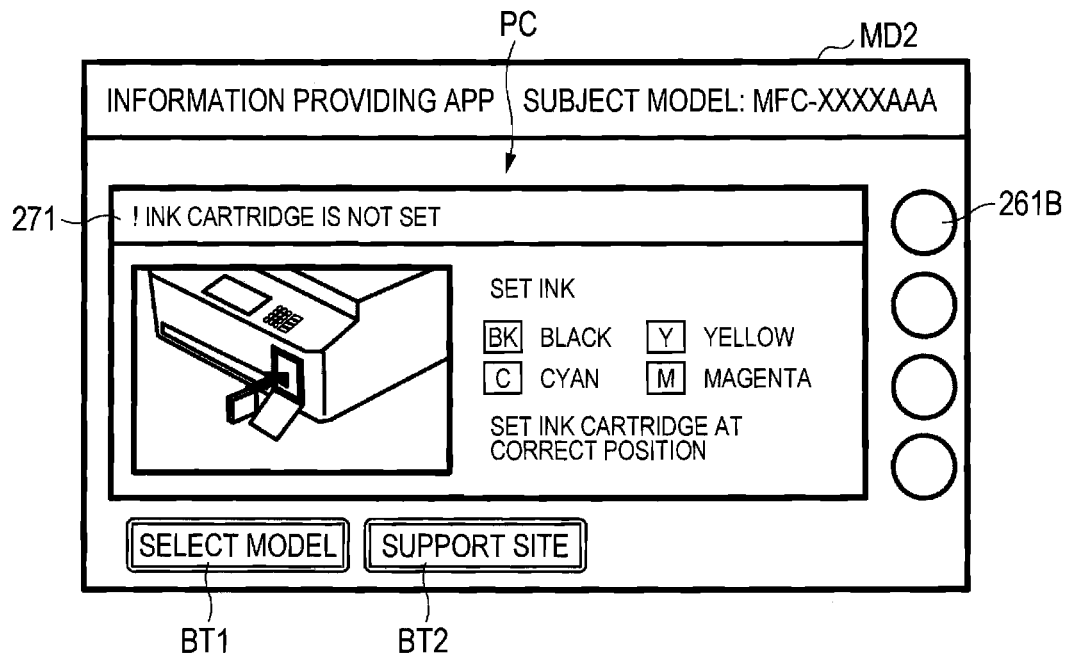
FIG. 8 is a view showing a shot image PC.

FIG. 8 shows a display image MD2 including the shot image PC represented by the shot image data acquired in S45. The display image MD2 is displayed on the displaying section 470 of the mobile terminal 400 immediately after the shot image data is acquired. In the example of FIG. 8, the shot image PC includes an image 271 showing the display panel of the displaying section 270 and an image 261B showing the operational buttons 260B provided near the display panel of the displaying section 270 of the multifunction peripheral 200. Hereinafter, a partial image showing the UI image in the shot image (an image of the display panel) is also referred to as a shot UI image 271.

In S55 in FIG. 4, the shot-image-information acquiring section 321 uses the shot image data acquired in S45 to generate shot image information indicative of characteristics of the shot image PC. Specifically, the shot-image-information acquiring section 321 generates information similar to the candidate image information stored in the candidate-image-characteristics table group DT1.

Specifically, the shot-image-information acquiring section 321 performs an edge extracting process on the shot image PC to identify the shot UI image 271 in the shot image PC. Further, the shot-image-information acquiring section 321 performs a tilt correcting process (rotation process) and a scaling process on the shot UI image to acquire image data indicative of the shot UI image 271 that is modified to the appropriate size and orientation.

Further, the shot-image-information acquiring section 321 divides the modified shot UI image into the above-described M×K square blocks (M blocks vertically and K blocks horizontally), and assigns the object identification values (for example, character=1, apparatus image=2, . . . ) for identifying an object in each block (character, apparatus image, symbol, background 1 (band region), background 2 (main display region)), thereby generating arrangement data (block image data) of the shot UI image. Recognition of objects in each block can be performed by using various known methods. For example, the shot-image-information acquiring section 321 calculates an average edge amount and an average color value for each block, and compares the average edge amount and the average color value with reference values, thereby recognizing the objects. General arrangement of the UI image is common to the plurality of UI images. For example, as shown in FIGS. 3A and 3B, the apparatus image is displayed at the left side of the center of the UI image in the horizontal direction, and the character image is displayed at the right side of the center of the UI image. In this way, relatively high determination accuracy can be achieved by determining an object in each block, while considering the general arrangement.

Further, the shot-image-information acquiring section 321 generates histogram data of the shot UI image for each of a plurality of regions defined in the arrangement data (a region of character image, a region of apparatus image DI1, . . . ), thereby generating color data of the shot UI image.

In S60, the candidate-image-information acquiring section 322 acquires candidate image information (arrangement data and color data) from the candidate image characteristics table identified in S35.

In S65 in FIG. 5, the determining section 325 uses the candidate image information and the shot image information to determine, from among the plurality of candidate images, a candidate image similar to the UI image in the shot image PC, that is, a candidate image similar to the UI image represented by the shot UI image. Specifically, the determining section 325 uses the shot image information and the plurality of candidate image information corresponding to the plurality of candidate images stored in the candidate image characteristics table to calculate a plurality of similarities SL for the plurality of candidate images. Specifically, the determining section 325 calculates a color similarity CS and an arrangement similarity AS for each candidate image. The color similarity CS is similarity between color data of the candidate image information to be calculated and color data of the shot image information. The arrangement similarity AS is similarity between arrangement data of the candidate image information to be calculated and arrangement data of the shot image information.

The color similarity CS is calculated, for example, by using two histogram data that are two color data to be calculated. Here, vector I=(vh1, vh2, vh3, . . . ) is the vector of histogram data, assuming that vh1, vh2, vh3 . . . are frequencies of a plurality of classes h1, h2, h3, . . . of the histogram data. The color similarity CS is represented by an angular distance cosθ between two vectors I1 and I2 of two histogram data to be calculated.

The arrangement similarity AS is calculated, for example, by using two block image data that are two arrangement data to be calculated. The arrangement similarity AS is, for example, the number of coincident pixels PN1 divided by a total number of pixels PN2(PN1/PN2). The number of coincident pixels PN1 is the number of pixel values of first block image data coincident with corresponding pixel values of second block image data of two block image data, out of M×K pixel values (M pixels vertically and K pixels horizontally) constituting the first block image data. The total number of pixels PN2 is the total number of all the pixels included in one block image data (specifically, M×K).

A similarity SL calculated for each candidate image is represented by a sum of the color similarity CS and the arrangement similarity AS. The evaluation methods of such similarity of images are well known. For example, similar evaluation methods are described in Japanese Patent Application Publication No. H8-202733 and Japanese Patent Application Publication No. 2007-094962.

When the plurality of similarities SL for the plurality of candidate images is calculated, the determining section 325 then uses the plurality of similarities SL to determine the candidate image similar to the shot UI image. If there is only one similarity SL exceeding a predetermined threshold value TH in the plurality of similarities SL, the candidate image corresponding to the one similarity SL exceeding the threshold value TH is determined as one candidate image nearest to the shot UI image. On the other hand, if there are two or more similarities SL exceeding the predetermined threshold value TH in the plurality of similarities SL, or if there is no similarity SL exceeding the predetermined threshold value TH in the plurality of similarities SL, the candidate image similar to the shot UI image is not determined.

In S70, the information providing section 300 determines whether one candidate image has been determined in S65. If one candidate image has been determined (S70: YES), the identification-information acquiring section 324 acquires corresponding URL serving as identification information corresponding to the determined candidate image and candidate image information, from the candidate image characteristics table (FIGS. 7A-7C) (S73). After the corresponding URL is acquired, the information providing section 300 moves the process to S110.

If one candidate image cannot be determined (S70: NO), the candidate-image acquiring section 323 acquires a predetermined plurality of candidate image data from the candidate-image data group DT2 (FIG. 1) (S75). The predetermined plurality of candidate image data represents respective ones of a predetermined plurality of candidate images, out of all the candidate images. The predetermined plurality of candidate images is also referred to as a plurality of selection-subject candidate images SG. The candidate image data included in the candidate-image data group DT2 stored in the non-volatile storage device 420 may only include candidate image data representing the plurality of selection-subject candidate images SG, or may also include candidate image data representing candidate images other than the selection-subject candidate images SG.

In S80, the second receiving section 360 displays a candidate-image selection image SE including the plurality of selection-subject candidate images SG on the displaying section 470 to receive selection by the user.

Figure 9:
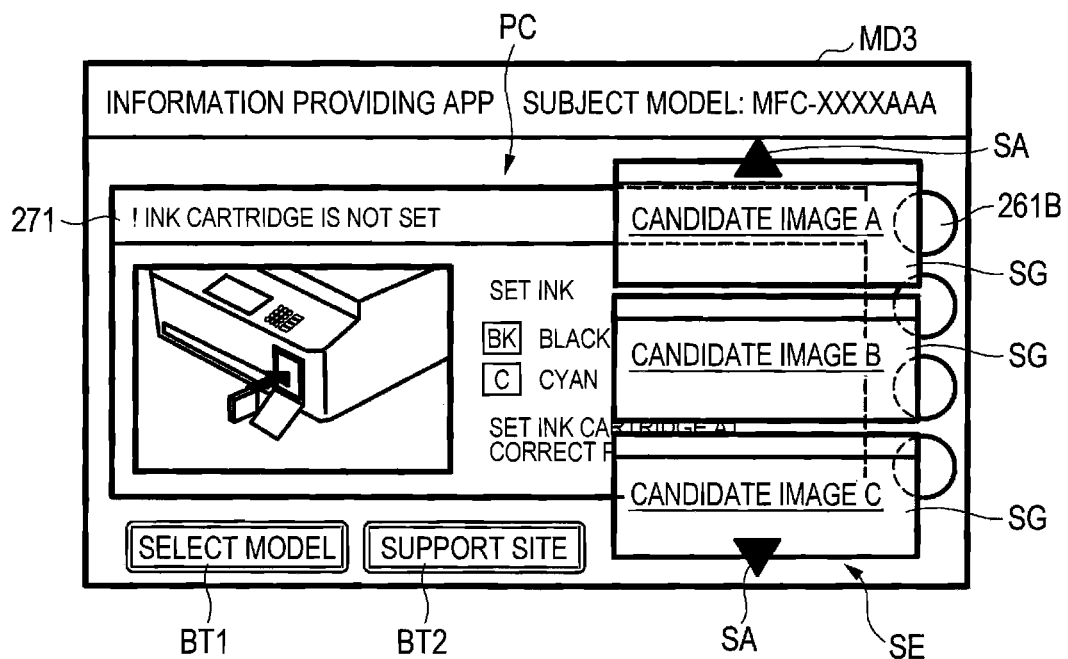
FIG. 9 is a view showing an example of a display image MD3 including a candidate-image selection image SE.
Figure 10:
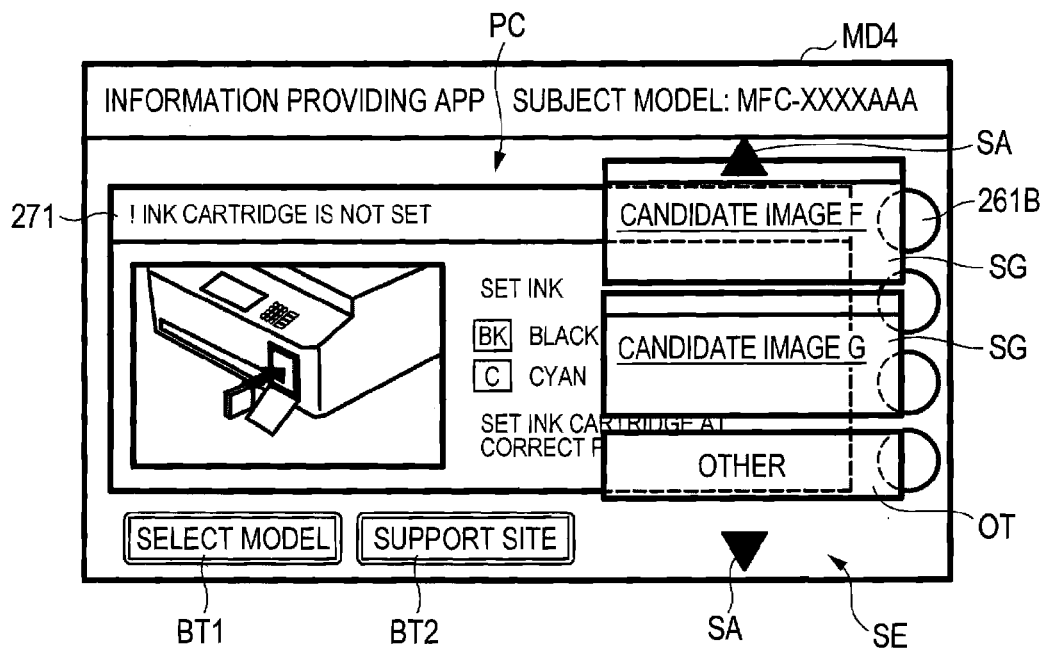
FIG. 10 is a view showing an example of a display image MD4 including the candidate-image selection image SE.

As shown in FIGS. 9 and 10, the display image MD3 (FIG. 9) is an image in which the candidate-image selection image SE is displayed over the display image MD2 (FIG. 8). The candidate-image selection image SE is displayed with semi-transparent image processing, and is displayed over a portion of the shot image PC, specifically, a region at the right side of the center of the shot image PC in the left-right direction. The candidate-image selection image SE includes the plurality of selection-subject candidate images SG, a special selection image OT (FIG. 10), and scroll buttons SA for receiving instructions of scrolling the candidate-image selection image SE in the upper-lower direction. In the present embodiment, it is not that all of the plurality of selection-subject candidate images SG are displayed at the same time, but the user can operate the scroll buttons SA to switch displayed images out of the plurality of selection-subject candidate images SG (FIGS. 9 and 10).

Each selection-subject candidate image SG is smaller than the shot UI image 271 in the shot image PC, and a predetermined number (three in the example of FIG. 9) of the selection-subject candidate images SG are displayed at a time. Further, each selection-subject candidate image SG is displayed over a portion other than a principal characteristic portion of the shot UI image 271, that is, in the example of FIG. 9, the left-side portion in which an apparatus image and principal message are displayed. In this way, each selection-subject candidate image SG is displayed in a mode in which the user can easily compare each selection-subject candidate image SG with the shot UI image 271. Note that each selection-subject candidate image SG may be displayed, one at a time, in a size similar to the size of the shot UI image 271 in the shot image PC.

As shown in FIG. 10, when the candidate-image selection image SE is scrolled downward, a special selection image OT is displayed at the lower side of the lowest selection-subject candidate image SG. In the example of FIG. 10, characters "OTHER" is displayed in the special selection image OT. The user can select one image from among the plurality of selection-subject candidate images SG and the special selection image OT.

In S85 in FIG. 5, the information providing section 300 determines whether a selection result of the user received by the second receiving section 360 is the selection-subject candidate image SG or the special selection image OT.

If the selection result of the user is the selection-subject candidate image SG, the identification-information acquiring section324 acquires the corresponding URL serving as the identification information corresponding to the selected selection-subject candidate image SG from the candidate image characteristics table (FIGS. 7A-7C) (S107).

In S110, the third acquiring section 330 (the CPU 410) executes the browser program PG3 (FIG. 1) to start the WEB browser 50 (FIG. 1).

In S115, the third acquiring section 330 uses the acquired identification information (in the present embodiment, corresponding URL) to acquire support information associated with the candidate image from the server 60. Specifically, the third acquiring section 330 provides WEB browser 50 with the corresponding URL serving as the identification information, and uses the WEB browser 50 to acquire support information associated with the candidate image from the server 60.

In S120, the WEB browser 50 displays the acquired support information on the displaying section 470.

Figure 11:
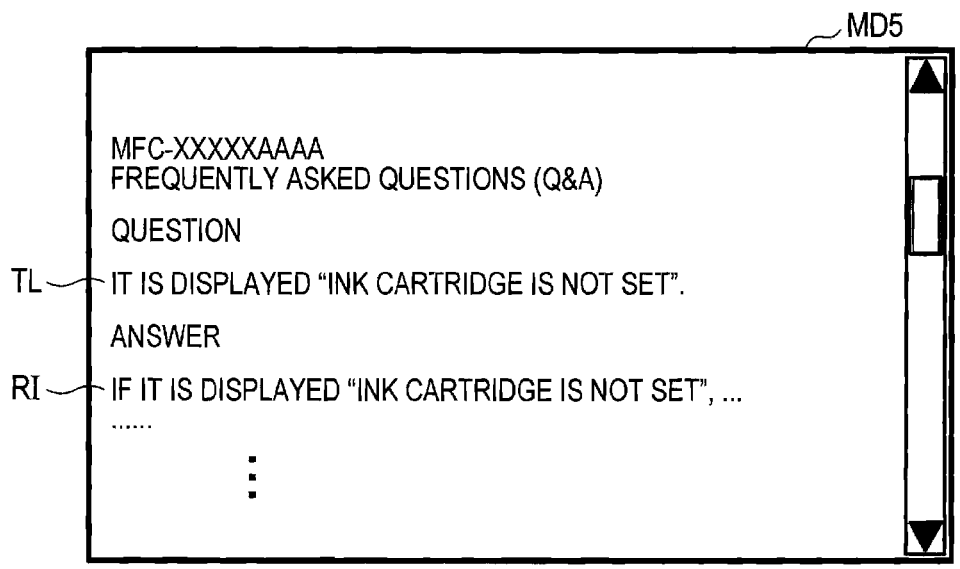
FIG. 11 is a view showing an example of a display image MD5 of support information.

A display image MD5 in FIG. 11 is an image of a page including support information corresponding to the candidate image out of the plurality of WEB pages provided by the server 60. The page shown in FIG. 11 is created assuming that the user of the multifunction peripheral 200 consults this page when the UI image (FIG. 3A) to be imaged at acquisition of the shot image data in S45 is displayed on the multifunction peripheral 200. FIG. 11 illustrates a page that shows in detail a solution when the displayed UI image indicates an error that an ink cartridge is not mounted.

In S85 in FIG. 5, if the selection result of the user is the special selection image OT (FIG. 10), the information providing section 300 starts the WEB browser 50 (S90).

In S95, the WEB browser 50 displays, on the displaying section 470, a list image MD6 showing a list of support information items associated with a plurality of UI images that can be displayed on the multifunction peripheral 200. Specifically, the WEB browser 50 receives a URL of a WEB page representing the list image MD6 from the information providing section 300, and uses the URL to access the server 60 so that the list image MD6 is displayed.

Figure 12:
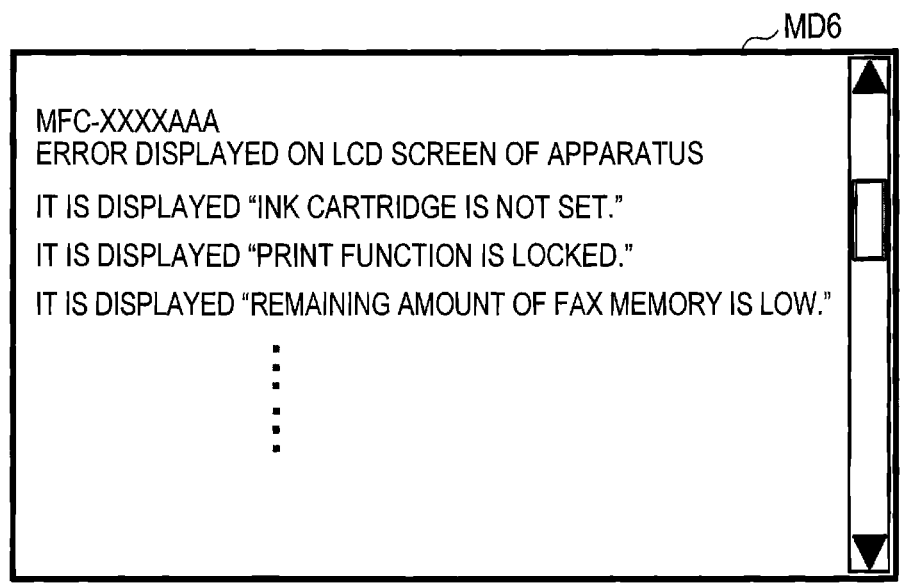
FIG. 12 is a view showing an example of a list image MD6.

The list image MD6 shown in FIG. 12 covers a large number of items corresponding to a large number of errors that may occur at the multifunction peripheral 200. Accordingly, it is highly likely that the list image MD6 includes a specific item corresponding to the error that currently occurs at the multifunction peripheral 200.

In S100, the WEB browser 50 receives, from the user, selection of an item included in the list image MD6 through the list image MD6. In S105, the WEB browser 50 acquires support information of the selected item from the server 60.

In S120, the WEB browser 50 displays the acquired support information on the displaying section 470.

According to the present embodiment as described above, analysis is performed on shot image data that is obtained by imaging the displaying section 270 that displays a specific UI image indicative of a specific state of the multifunction peripheral 200 (for example, an error state such as paper empty), thereby acquiring a URL indicative of a location of a specific support information associated with a specific UI image. And, the specific support information can be acquired based on the acquired URL, and displayed on the displaying section 470 of the mobile terminal 400. As a result of this, the mobile terminal 400 can provide the user with appropriate information depending on the specific UI image displayed on the displaying section 270 of the multifunction peripheral 200.

When an error occurs at the multifunction peripheral 200, a UI image displayed on the displaying section 270 also provides information associated with the error that currently occurs at the multifunction peripheral 200. However, it is relatively difficult to provide sufficient information by the UI image displayed on the displaying section 270, due to limitation in the capacity of the non-volatile storage device 220 of the multifunction peripheral 200, limitation in the resolution and size of the displaying section 270, and the like.

Hence, support information including information on errors and the like is provided at the server 60 as a WEB service. However, even if the server 60 provides ample support information of the multifunction peripheral 200 as the WEB service, in some cases it cannot be said that the support information is fully utilized by the user of the multifunction peripheral 200. For example, it is burdensome for the user to reach desired support information in the support information group 651 in a large number of support information.

According to the present embodiment, for example, by imaging, with the mobile terminal 400, a UI image displayed when an error occurs at the multifunction peripheral 200, the user can easily obtain support information associated with the error that occurs.

Further, the mobile terminal 400 acquires shot image information indicative of characteristics of the shot image by analyzing the shot image information. And, the mobile terminal 400 acquires, from the table etc. (FIGS. 7A-7C), the plurality of candidate image information indicative of characteristics of the plurality of candidate images. The mobile terminal 400 uses the shot-image-information acquiring section and the plurality of candidate image information to determine candidate image information of the nearest candidate image (FIG. 5: S65). And, the mobile terminal 400 acquires identification information (for example, corresponding URL) corresponding to the determined candidate image information. Accordingly, appropriate support information can be displayed by using the plurality of candidate image information indicative of respective characteristics of the plurality of candidate images. That is, appropriate relevant information can be displayed for the user.

Further, support information to be provided is displayed using characteristics of the UI image itself (for example, the color and arrangement of regions). Hence, the multifunction peripheral 200 does not need to have a feature of displaying special information for identifying support information to be provided (for example, information such as URL and QR code (registered trademark)). As a result of this, for an existing apparatus, relevant information associated with a UI image displayed on a displaying section of the existing apparatus can be easily provided to the user. For example, as to support information of the multifunction peripheral 200 that has no special feature and that has already been marketed, appropriate support information can be easily provided based on characteristics of the UI image displayed on the already-marketed multifunction peripheral 200.

Further, the mobile terminal 400 analyzes the shot image data and uses the acquired URL to access the server 60, thereby acquiring support information from the server 60. The user can easily display support information stored in the server 60 on the mobile terminal 400.

Further, the mobile terminal 400 receives an input on a type (model) of the multifunction peripheral 200 from the user, and uses an analysis result of shot image data and apparatus information (product information) indicative of the model of the multifunction peripheral 200 to acquire a specific URL. Accordingly, depending on the type of the multifunction peripheral 200, appropriate relevant information can be displayed on the displaying section 470. For example, even when the same UI image is imaged, support information to be provided sometimes differs if the type (model) of the multifunction peripheral 200 differs. More specifically, even for two models using the same UI image data as the UI image (FIG. 3A) for showing an occurrence of an error that the ink cartridge CT is not mounted, in some cases the product number and the type of a usable ink cartridge differ from each other. Even in such a case, the URL of support information to be provided is acquired in the light of the analysis result of shot image data as well as the model of the multifunction peripheral 200. Hence, support information showing the product number and the type of the appropriate ink cartridge for each model can be provided.

In a case where a URL is acquired using the analysis result of the first shot image data and the model information of the multifunction peripheral 200, when a URL is acquired using the analysis result of the second shot image data acquired after the first shot image data is acquired, an input (reception) of the model is not performed. For example, if the model information of the multifunction peripheral 200 is inputted at the first time, an input of the model is not performed (skipped) at the second time and thereafter (FIG. 4: S20). As a result of this, when the second shot image data is analyzed to acquire identification information, the appropriate URL can be acquired without receiving the type of the multifunction peripheral 200. Hence, an operational burden on the user can be reduced.

Further, when the mobile terminal 400 cannot acquire a specific URL by analyzing shot image data, the mobile terminal 400 displays the plurality of selection-subject candidate images SG on the displaying section 470 to receive selection of the user (FIGS. 9 and 10). And, the specific URL is acquired using the received selection result of the user. Accordingly, even when a specific URL cannot be acquired by analyzing shot image data, appropriate support information can be displayed on the mobile terminal 400.

Further, when the mobile terminal 400 cannot acquire a specific URL by analyzing shot image data, the mobile terminal 400 displays a predetermined number of candidate images on the displaying section 470 (FIGS. 9 and 10). This suppresses a situation in which an excessive number of candidate images are displayed and operations become complicated.

Further, the mobile terminal 400 displays, on the displaying section 470, the plurality of selection-subject candidate images SG and the shot image PC represented by shot image data, for receiving selection of the user. Consequently, the candidate image corresponding to the shot image PC can be easily selected, while comparing the selection-subject candidate images SG with the shot image PC.

The mobile terminal 400 displays the special selection image OT on the displaying section 470 as the specific option, in addition to the plurality of selection-subject candidate images SG. And, when the special selection image OT is selected, the mobile terminal 400 displays, on the displaying section 470, a plurality of error items that is highly likely to include a specific error item corresponding to the error that currently occurs at the multifunction peripheral 200. Specifically, the list image MD6 of error items shown in FIG. 12 is displayed on the displaying section 470. Hence, the user is allowed to select the appropriate support information, while suppressing an excessive increase in a displayed number of the selection-subject candidate images SG.

Figure 13:
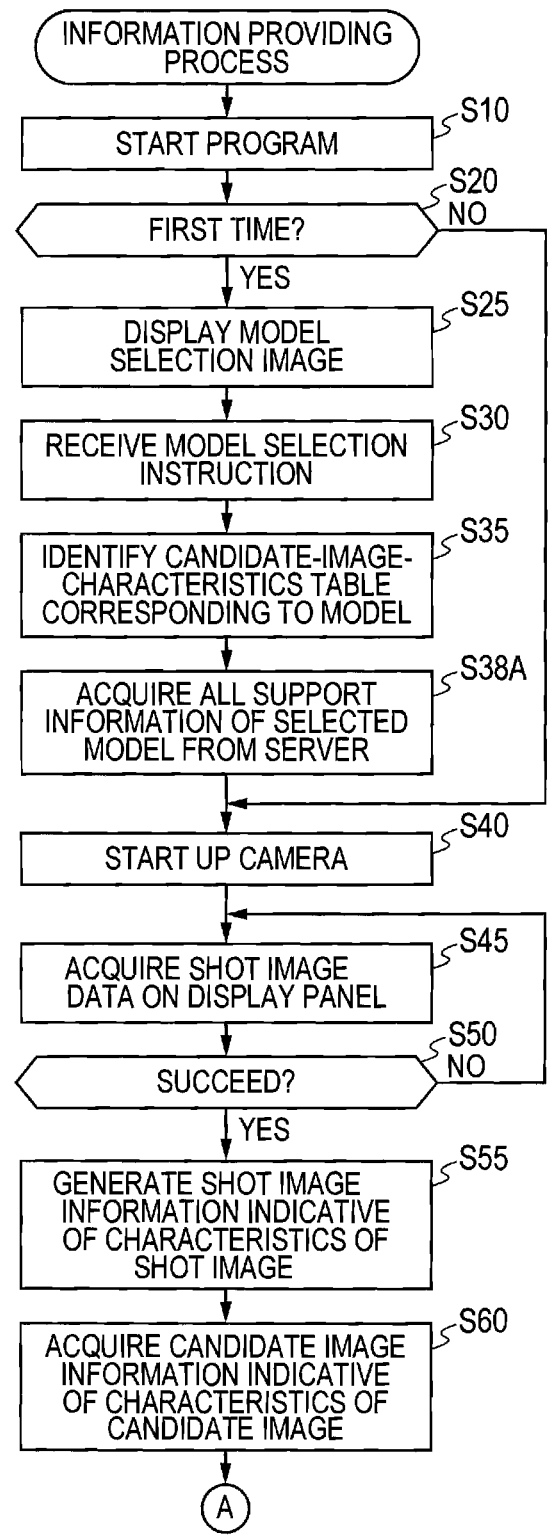
FIG. 13 is a flowchart showing a part of an information providing process according to a second embodiment.
Figure 14:
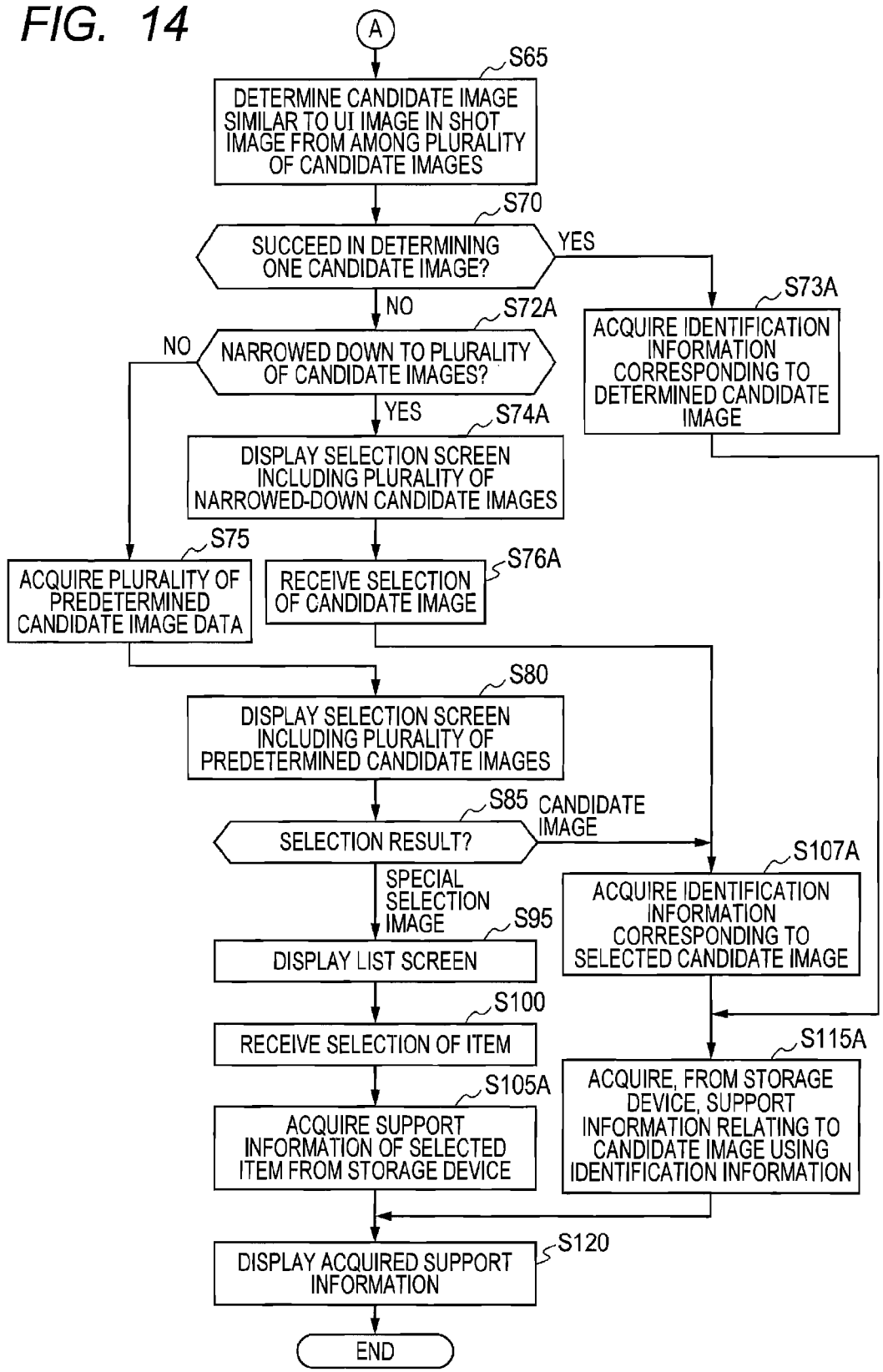
FIG. 14 is a flowchart showing the other part of the information providing process according to the second embodiment.

B. Second Embodiment:

A second embodiment of the invention will be described while referring to FIGS. 13 and 14. In FIGS. 13 and 14, the same steps as the information providing process in the first embodiment (FIGS. 4 and 5) are designated by the same reference numerals to avoid duplicating description, and the steps different from the information providing process in the first embodiment are designated by reference numerals with a suffix "A".

The second embodiment differs from the first embodiment mainly in two points. The first point is that the entire support information for one subject model is stored in a storage device of the mobile terminal 400. First, this point will be described.

In the information providing process of the second embodiment, after the subject model is selected by receiving a model selection instruction in S30, in S38A the third acquiring section 330 acquires all the support information of the selected subject model from the server 60. The acquired support information is stored in a storage device within the mobile terminal 400, for example, in the non-volatile storage device 420.

And, in the information providing process of the second embodiment, identification information acquired in S73A and S107A in FIG. 14 is not a URL but identification information that can identify a location within the non-volatile storage device 420 at which support information to be acquired is stored. The identification information is an address, a filename of a file including support information, or the like.

And, in the information providing process of the second embodiment, in S115A, support information is acquired from the non-volatile storage device 420 using the above-described identification information.

Similarly, in S105A, support information of an item selected by the user is acquired from the non-volatile storage device 420.

In the second embodiment, support information for one model is stored in the non-volatile storage device 420. Hence, as long as the subject model is not changed, no communication occurs between the mobile terminal 400 and the server 60. This can suppress a possibility that support information cannot be acquired due to a communication failure or the like.

Also, the non-volatile storage device 420 of the mobile terminal 400 may store support information of all the models which the information providing section 300 can deal with, not support information for one model. This configuration can further reduce a possibility that communication occurs between the mobile terminal 400 and the server 60.

Next, the second point in which the second embodiment differs from the first embodiment will be described.

If in S65 shot image data is analyzed and one candidate image similar to the shot UI image cannot be determined based on a comparison result between the similarity SL and the threshold value TH (S70: NO), although one candidate image cannot be determined, the information providing section 300 determines whether the candidate images similar to the shot UI image are narrowed down to a plurality of candidates (S72A).

As described above, a condition for determining one candidate image similar to the shot UI image is that there is only one similarity SL exceeding the threshold value TH out of a plurality of similarities SL that is calculated for each candidate image. Accordingly, the cases that one candidate image similar to the shot UI image is not determined include the following two cases.

(1) There are two or more similarities SL exceeding the threshold value TH out of the plurality of similarities SL that is calculated for each candidate image.

(2) There is no similarity SL exceeding the threshold value TH out of the plurality of similarities SL that is calculated for each candidate image.

Here, in the case of the above-described (1), the information providing section 300 determines that one candidate image similar to the shot UI image is narrowed down to two or more candidate images corresponding to two or more similarities SL exceeding the threshold value TH. In the case of the above-described (2), the information providing section 300 determines that one candidate image similar to the shot UI image is not narrowed down to a specific number of candidate images.

Here, if it is determined that one candidate image similar to the shot UI image is not narrowed down to a specific number of candidate images (S72A: NO), the same process is executed as the first embodiment and descriptions are omitted.

Here, if it is determined that one candidate image similar to the shot UI image is narrowed down to a specific number of candidate images (S72A: YES), the second receiving section 360 displays a selection screen including the narrowed-down predetermined number of candidate images on the displaying section 470 (S74A). In subsequent S76A, the second receiving section 360 receives selection of a candidate image from the user through the selection screen displayed in S74A.

According to the second embodiment, when a predetermined number of candidate images similar to shot image represented by shot image data is identified by analyzing shot image data, the user can select one candidate image out of the predetermined number of candidate images similar to the shot image. Hence, an operational burden on the user can be reduced.

C. Modifications:

While the invention has been described in detail with reference to the above aspects thereof, it would be apparent to those skilled in the art that various changes and modifications may be made therein without departing from the scope of the claims. The invention also encompasses its equivalents.

(1) In the above-described embodiments, a multifunction peripheral is described as an example of the apparatus (product). Alternatively, the apparatus may be another electronic device such as a digital camera, a single-function printer, a scanner, or the like.

(2) A part of the processes executed by the information providing section 300 of the mobile terminal 400 may be executed by another computer connected to the mobile terminal 400 (for example, a server). For example, after the mobile terminal 400 acquires shot image data in S50 in FIG. 4, the shot image data may be transmitted to a predetermined server. In this case, the server having received the shot image data may execute processes from S55 through S115 and may transmit the acquired URL to the mobile terminal 400.

(3) In the above-described embodiments, the method of evaluating similarity between the candidate image and the shot image is merely one example, and another method may be used. Instead of the above-described method using the histogram data and the block image data, a method of using frequency components of an image or a method of using character recognition technology may be adopted. Such a method of evaluating similarity of two kinds of images is disclosed, for example, in Japanese Patent Application Publication No. 2001-167118 (a method of comparing coefficients indicative of frequency components of an image) and Japanese Patent Application Publication No. 2008-234327 (a method of comparing histogram data obtained by converting chromaticity of an image into histogram on a chromaticity diagram).

(4) In the above-described embodiments, the mobile terminal 400 and the server 60 cooperate to provide the user with support information. However, the mobile terminal 400 alone may provide the user with support information. In this case, support information of all the items of all the models may be stored in the non-volatile storage device 420 of the mobile terminal 400. In this case, after identifying one candidate image corresponding to the shot image PC, the information providing section 300 of the mobile terminal 400 may acquire corresponding support information from the non-volatile storage device 420 and display the support information, based on identification information corresponding to the candidate image (for example, names of error items, and addresses within the non-volatile storage device 420).

(5) In the above-described first embodiments, URL is used as identification information corresponding to candidate images. Alternatively, error items or identifiers (or identifier codes) of candidate images may be used. In this case, for example, the information providing section 300 of the mobile terminal 400 transmits an error item or an identifier of the candidate image to the server 60 for inquiring about URL. The server 60 returns the URL corresponding to the error item or the identifier of the candidate image to the information providing section 300. The mobile terminal 400 provides the WEB browser with the URL acquired from the server, thereby displaying the corresponding support information on the displaying section 470, like the above-described embodiment. In this modification, as long as the administrator of the server 60 updates WEB page in which support information is provided on the server 60, even when URL is changed, the mobile terminal 400 can acquire support information without any difficulty.

(6) In the above-described embodiments, candidate image information is preliminarily calculated and stored in the candidate image characteristics table (FIGS. 7A-7C). However, the candidate-image-information acquiring section 322 may analyze candidate image data indicative of a candidate image to create candidate image information. A method of creating candidate image information is, for example, similar to a method of creating shot image information by the shot-image-information acquiring section 321.

(7) In the above-described embodiments, the candidate-image data group DT2 is store in the non-volatile storage device 420. However, it is not always necessary that the candidate-image data group DT2 be stored in the non-volatile storage device 420. Even though the candidate-image data group DT2 is not stored, as long as candidate image characteristics tables (FIGS. 7A-7C) including preliminarily-calculated candidate image information are stored, the information providing section 300 can determine one candidate image corresponding to the shot image PC. In a case where the candidate-image data group DT2 is not stored, the information providing section 300 cannot display the selection-subject candidate images SG (FIG. 9). In this case, instead of displaying the selection-subject candidate images SG, the information providing section 300 may display states of the multifunction peripheral 200 corresponding to the selection-subject candidate images SG (for example, error states) with characters (i.e., not with images).

(8) In the above-described embodiments, the UI image (FIG. 3) indicative of an error state of the multifunction peripheral 200 is illustrated as an example of a state image indicative of the current state of the apparatus, and the solution of an error is illustrated as an example of relevant information associated with the state image. Alternatively, the state image indicative of the current state of the apparatus may be a UI image showing a standby state for receiving a print instruction and a scan instruction by the user (standby screen), or a UI image showing a setting processing state for receiving an input by the user on various settings (network settings, initial settings, etc.) (setting screen). And, the relevant information associated with the state image may be specific explanations on a print process or a scan process that can be selected on the UI image in the standby state. Further, the relevant information associated with the state image may be explanations on various setting items that can be set on the UI image in the setting processing state, and explanations on specific setting methods of the various setting items.

(9) A part of configurations realized by hardware in the above-described embodiments may be substituted with software. Conversely, a part of configurations realized by software in the above-described embodiments may be substituted with hardware.

(10) When a part or all of functions of the invention is realized by software, the software (computer program) can be provided in a form stored in a computer-readable storage medium. The "computer-readable storage medium" is not limited to portable storage mediums such as a memory card and a CD-ROM, but also includes an internal storage device within a computer such as various RAM, ROM, etc. and an external storage device connected to a computer such as a hard disk drive, etc.

What is claimed is:

1. A controller for an imaging terminal including an imaging device and a first displaying device, the controller comprising:

a processor; and a memory storing instructions, the instructions, when executed by the processor, causing the processor to perform:

acquiring shot image data, the shot image data being obtained by shooting a second displaying device which is a part of an apparatus, the apparatus being a target device to be shot, the second displaying device being configured to display a specific state image indicative of an error that currently occurs at the apparatus;

identifying, by analyzing the shot image data, one candidate image corresponding to the shot image data from among a plurality of candidate images configured to be displayed on the second displaying device, each of the plurality of candidate images being indicative of an error that occurs at the apparatus, a storage device storing a plurality of candidate image data indicative of respective ones of the plurality of candidate images;

acquiring specific identification information used for acquiring specific relevant information corresponding to the identified one candidate image, the specific relevant information being indicative of a solution for resolving the error indicated by the identified one candidate image, the specific identification information being indicative of a storage location in which the specific relevant information is stored;

acquiring the specific relevant information by using the specific identification information; and controlling the first displaying device to display the specific relevant information.

2. The controller according to claim 1, wherein the instructions of acquiring specific identification information further cause the processor to perform:

acquiring shot image information indicative of characteristics of a shot image represented by the shot image data;

acquiring a plurality of candidate image information indicative of characteristics of respective ones of the plurality of candidate images, each of the plurality of candidate images being an image that is displayed on the second displaying device as the state image indicative of a state of the apparatus;

determining specific candidate image information indicative of characteristics of a specific candidate image nearest to the shot image from among the plurality of candidate images, by using the shot image information and the plurality of candidate image information, the specific candidate image being the identified one candidate image; and acquiring the specific identification information corresponding to the specific candidate image information from a storage section that stores the candidate image information and the identification information in association with each other for each of the plurality of candidate images.

3. The controller according to claim 2, wherein the shot image information includes color data representing characteristics relating to color of the shot image and arrangement data representing characteristics relating to arrangement of the shot image;

wherein each of the plurality of candidate image information includes color data representing characteristics relating to color of the candidate image information and arrangement data representing characteristics relating to arrangement of the candidate image information; and wherein the instructions of determining specific candidate image information further cause the processor to perform:

calculating a color similarity between the color data of the shot image information and the color data of one of the plurality of candidate image information, for each of the plurality of candidate images;

calculating an arrangement similarity between the arrangement data of the shot image information and the arrangement data of one of the plurality of candidate image information, for each of the plurality of candidate images; and determining a candidate image to be displayed on the first displaying device from the plurality of candidate images by using the color similarity and the arrangement similarity.

4. The controller according to claim 1, wherein the specific relevant information is stored in a server connected to the controller via a network;

wherein the instructions of acquiring specific identification information further cause the processor to perform acquiring, as the specific identification information, specific positional information indicative of the storage location of the specific relevant information in the server; and wherein the instructions of acquiring the specific relevant information further cause the processor to perform accessing the server by using the specific positional information to acquire the specific relevant information.

5. A controller for an imaging terminal including an imaging device and a first displaying device, the controller comprising:

a processor; and a memory storing instructions, the instructions, when executed by the processor, causing the processor to perform:

acquiring shot image data, the shot image data being obtained by shooting a second displaying device which is a part of an apparatus, the apparatus being a target device to be shot, the second displaying device being configured to display a specific state image indicative of a current state of the apparatus;

receiving an input of a type of the apparatus from the user;

acquiring, by analyzing the shot image data and apparatus information indicative of the type of the apparatus, specific identification information for identifying specific relevant information associated with the specific state image;

acquiring the specific relevant information by using the specific identification information; and controlling the first displaying device to display the specific relevant information.

6. The controller according to claim 5, wherein, in a case where first identification information is acquired by using an analysis result of first shot image data and the apparatus information, the receiving of an input of the type of the apparatus is skipped when second identification information is acquired by using an analysis result of second shot image data acquired after the first shot image data is acquired.

7. The controller according to claim 1, wherein the instructions of acquiring specific identification information further cause the processor to perform:

acquiring, when acquisition of the specific identification information fails upon analyzing the shot image data, the plurality of candidate image data indicative of respective ones of the plurality of candidate images;

receiving selection of the user by displaying the plurality of the candidate images on the first displaying device; and acquiring the specific identification information by using a result of the selection of the user.

8. The controller according to claim 7, wherein the instructions of acquiring the plurality of candidate image data further cause the processor to perform, when acquisition of the specific identification information fails and a predetermined number of candidate images similar to a shot image represented by the shot image data is identified, acquiring the predetermined number of candidate images; and wherein the instructions of receiving selection of the user further cause the processor to perform displaying the predetermined number of candidate images on the first displaying device.

9. The controller according to claim 7, wherein the instructions of acquiring the plurality of candidate image data further cause the processor to perform, when acquisition of the specific identification information fails, acquiring a predetermined number of candidate images; and wherein the instructions of receiving selection of the user further cause the processor to perform displaying the predetermined number of candidate images on the first displaying device.

10. The controller according to claim 7, wherein the instructions of receiving selection of the user further cause the processor to perform displaying the plurality of candidate images and a shot image represented by the shot image data on the first displaying device to receive selection of the user.

11. The controller according to claim 7, wherein the instructions of receiving selection of the user further cause the processor to perform displaying a specific option in addition to the plurality of candidate images on the first displaying device; and wherein the instructions of controlling the first displaying device to display the specific relevant information further cause the processor to perform displaying a plurality of error items on the first displaying device when the specific option is selected, the plurality of error items being highly likely to include a specific error item corresponding to the error that currently occurs at the apparatus.

12. A non-transitory computer-readable medium storing a set of instructions that, when executed by a processor of an imaging terminal including an imaging device and a first displaying device, causes the processor to perform:

acquiring shot image data, the shot image data being obtained by shooting a second displaying device which is a part of an apparatus, the apparatus being a target device to be shot, the second displaying device being configured to display a specific state image indicative of an error that currently occurs at the apparatus;

identifying, by analyzing the shot image data, one candidate image corresponding to the shot image data from among a plurality of candidate images configured to be displayed on the second displaying device, each of the plurality of candidate images being indicative of an error that occurs at the apparatus, a storage device storing a plurality of candidate image data indicative of respective ones of the plurality of candidate images;

acquiring specific identification information used for acquiring specific relevant information corresponding to the identified one candidate image, the specific relevant information being indicative of a solution for resolving the error indicated by the identified one candidate image, the specific identification information being indicative of a storage location in which the specific relevant information is stored; and acquiring the specific relevant information by using the specific identification information to control the first displaying device to display the specific relevant information.

13. The controller according to claim 1, wherein the storage device includes the memory.

* * * * *